(12) United States Patent
Johannessen

(10) Patent No.: US 6,842,572 B2
(45) Date of Patent: Jan. 11, 2005

(54) TECHNIQUES TO GUIDE OPTICAL SIGNALS

(75) Inventor: Kjetil Johannessen, Trondheim (NO)

(73) Assignee: Intel Corporation, Santa Clara, CA (US)

(*) Notice: Subject to any disclaimer, the term of this patent is extended or adjusted under 35 U.S.C. 154(b) by 213 days.

(21) Appl. No.: 10/146,845

(22) Filed: May 15, 2002

(65) Prior Publication Data

US 2003/0215188 A1 Nov. 20, 2003

(51) Int. Cl.$^7$ ................................................. G02B 6/26
(52) U.S. Cl. ........................... 385/50; 385/39; 385/52; 385/37
(58) Field of Search ............................ 385/11, 15, 25, 385/37, 39, 43, 50, 52, 129–132

(56) References Cited

U.S. PATENT DOCUMENTS

| | | | | |
|---|---|---|---|---|
| 5,905,824 A | * | 5/1999 | Delisle et al. .................. 385/15 |
| 6,501,896 B2 | * | 12/2002 | Nara et al. .................... 385/129 |
| 6,738,545 B1 | * | 5/2004 | Purchase et al. ............... 385/37 |
| 6,763,164 B2 | * | 7/2004 | Kashihara et al. ............. 385/37 |
| 2003/0118284 A1 | * | 6/2003 | Ide ............................. 385/37 |

OTHER PUBLICATIONS

Yasuo Kokubun "Athermal Waveguides and Temperature Insensitive Lightwave Devices" FH2 (invited/CLEO/Pacific Rim Yokohama National Univ., Dept. of Electr. & Comp. Eng., 1999, pp. 1143–1144.

Yasuo Kokubun, Norihide Funato and Masanori Takizawa "Athermal Waveguides for Temperature–Independent Lightwave Devices", IEEE Photonics Technology Letters, vol. 5, No. 11, Nov. 1993, pp. 1297–1300.

* cited by examiner

Primary Examiner—Akm Enayet Ullah
Assistant Examiner—Sarah U Song
(74) Attorney, Agent, or Firm—Glen B. Choi

(57) ABSTRACT

A device that compensates for focal point drift of transmitted optical beams caused by ambient temperature changes by using a position adjuster to adjust the alignment of channels of a target planar lightwave circuit ("PLC"). The channels of the target PLC may taper open. In one implementation, the device may also use a birefringence plate to compensate for polarization dependent focal point drift.

31 Claims, 10 Drawing Sheets

TECHNIQUES TO GUIDE OPTICAL SIGNALS

FIELD

The subject matter disclosed herein generally relates to the field of optical circuits and in particular relates to techniques to transfer optical signals.

DESCRIPTION OF RELATED ART

Planar lightwave circuits (PLCs) are systems that include, but are not limited to, waveguides, light sources, and/or detectors in the plane of the circuit. One well known use of a PLC is as a waveguide for optical signals in optical networks. PLCs are often developed using silica-on-silicon (SOS) technology. FIG. 1 is a cross sectional schematic diagram that shows a typical SOS architecture. A layer of lower cladding 12 is typically formed onto a substrate 10. A waveguide core layer 20 is formed over the lower cladding 12, and an upper cladding 24 is formed over the waveguide core layer 20. Waveguide core layer 20 can be used to guide beams, such as light beams. In one example, the substrate 10 may be silicon, the lower cladding 12 may be $SiO_2$, the core layer 20 may be $SiO_2$ doped with Germanium, and the upper cladding 24 may be a borophosphosilicate glass (BPSG).

For example, FIG. 2 depicts an example of a system 200 having an arrayed waveguide 205 with multiple channels that each can transmit optical signals through a free propagation region (FPR) 210 to a target channel 220. Ambient temperature variations can change the refractive index of the channels of arrayed waveguide 205 that can cause variations in their dispersive properties and thereby change a focal point of light beams emitted from the channels of arrayed waveguide 205 and through the FPR 210. When a target of beams from channels of arrayed waveguide 205 is a target channel 220, ambient temperature variations might cause the beam to not focus onto the expected location (for the design wavelength) Such out-of-focus beam transmission can cause degradation of transmitted signal quality and lost signal power as well as interference with beams transmitted by adjacent waveguide channels or neighboring wavelength channels.

In this system 200, a material controls the position of the target channel 220. The material has thermal expansion properties so that when the ambient temperature changes, the material moves the target channel 220 along the surface 230 of the FPR 210, in the directions of the arrow, so that the beams transferred from the arrayed waveguide 205 focus onto the channel 220.

BRIEF DESCRIPTION OF THE DRAWINGS

Note that use of the same reference numbers in different figures indicates the same or like elements.

DETAILED DESCRIPTION

One embodiment of the present invention may include a first planar lightwave circuit having a channel to guide signals; a second planar lightwave circuit having a channel to receive the signals; and a position adjuster to adjust the location of the channel of the second planar lightwave circuit relative to the channel of the first planar lightwave circuit in response to changes in ambient temperature. These and other features and advantages of the present invention will become more apparent from the following detailed description taken together with the accompanying drawings.

Figure 3:
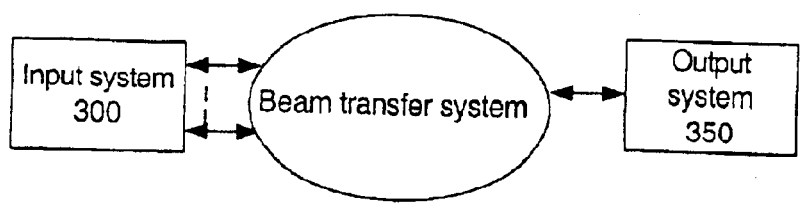
FIG. 3 depicts a system in which some embodiments of the present invention can be used.

FIG. 3 depicts a system in which some embodiments of the present invention can be used. An input system 300 may provide optical signals to a beam transfer system, which may multiplex or de-multiplex such optical signals according to wavelength and transfer select optical signals to an output system 350. The input system 300 can include a semiconductor optical amplifier (SOA) that can selectively block or amplify and transfer optical signals to the beam transfer system. One example implementation of an output system 350 is an optical-to-electrical signal converter. Such optical-to-electrical signal converters can provide the electrical signals to a SONET/SDH receiver and/or Gigabit Ethernet receiver.

Figure 4:
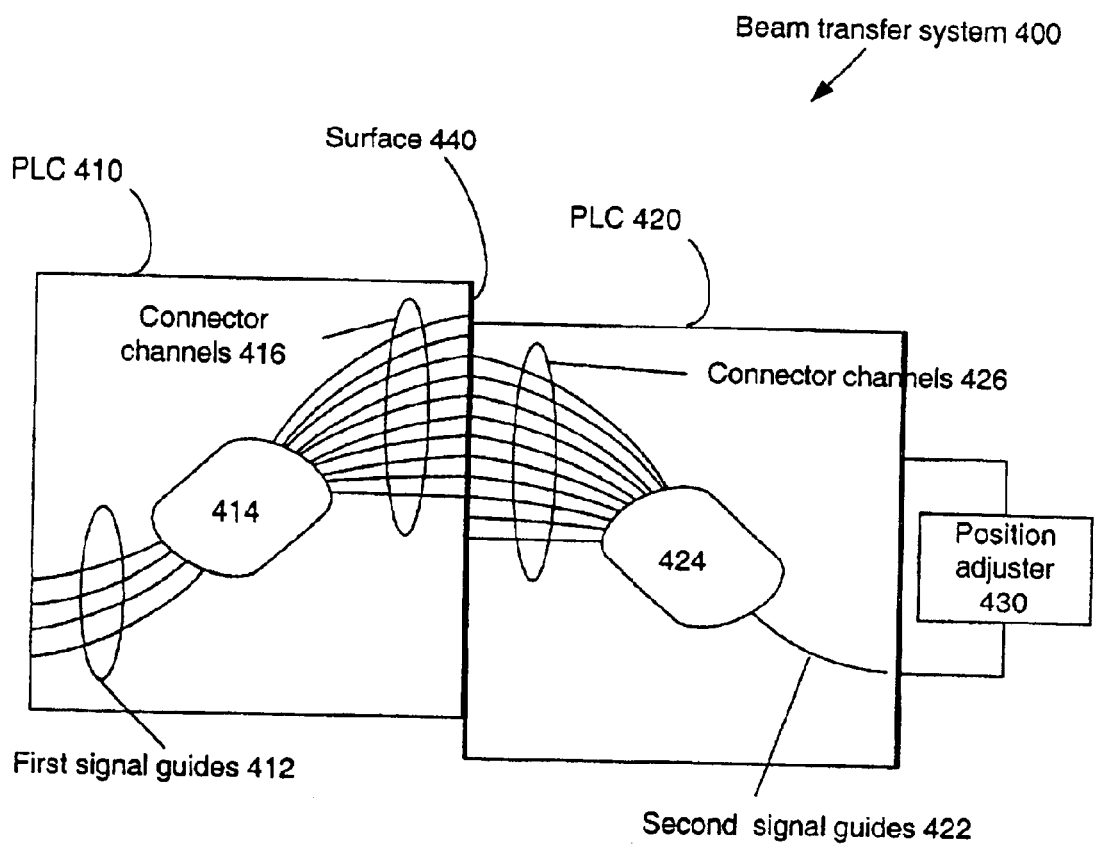
FIG. 4 schematically depicts an embodiment of the present invention in a beam transfer system.

FIG. 4 schematically depicts an embodiment of the present invention in beam transfer system 400. Beam transfer system 400 can include a first PLC 410 and second PLC 420. First PLC 410 can include first signal guides 412, free propagation region 414, and connector channels 416. Second PLC 420 can include second signal guides 422, free propagation region 424, and connector channels 426. Each of first signal guides 412, connector channels 416 and 426, and second signal guides 422 can transfer light beams. Although second signal guides 422 are depicted as having a single channel, second signal guides 422 can include multiple channels, each of which can guide optical signals. A position adjuster 430 can be used to move the second PLC 420 along, for example, the Y axis so that connector channels 416 transfer signals to complementary channels of connector channels 426 with little dispersion and little power loss.

Beam transfer system 400 can be used to multiplex optical signals transmitted by first signal guides 412. Conversely, beam transfer system 400 can be used to de-multiplex optical signals transmitted by second signal guides 422.

Position adjuster 430 can be implemented as a surface to which second PLC 420 is mounted and that has thermal expansion properties such that when the ambient temperature changes, the surface moves the second PLC 420 along the surface 440 of the first PLC 410, along, for example, the Y axis, so that first PLC 410 transfers signals to the complementary channels of the second PLC 420 with little dispersion and little power loss. For example, FIG. 5 depicts an example of beam transfer system 400 that shows second PLC 420 coupled to first PLC 410 using this example implementation of position adjuster 430 (shown as position adjuster 430A).

Figure 5:
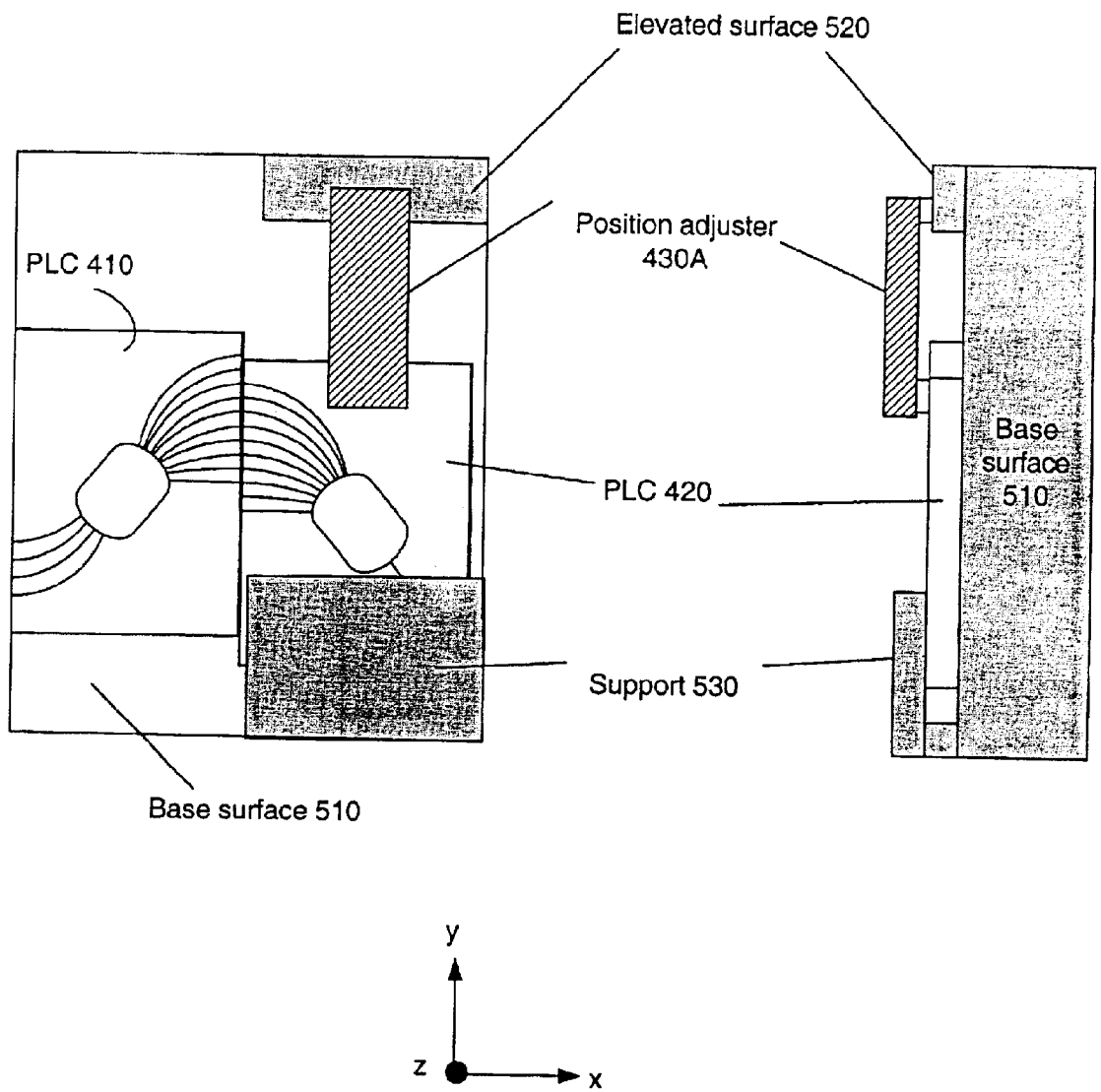
FIGS. 5 and 6 depict examples of a beam transfer system in accordance with embodiments of the present invention.

As shown in FIG. 5, first PLC 410 can be mounted to base surface 510. A glue can be used to mount first PLC 410 to base surface 510. Base surface 510 can have thermal expansion properties similar to those of the layer of first PLC 410 that contacts base surface 510 (e.g., silicon). One side of elevated base 520 can be mounted to base surface 510 and the opposite side of elevated base 520 can be mounted to position adjuster 430A. Position adjuster 430A in this implementation can but does not have to be rectangular shaped. Position adjuster 430A can be mounted to a side of second PLC 420 that is opposite to the side of second PLC 420 that contacts base surface 510. An adhesive can be used to affix position adjuster 430A to elevated base 520 and affix position adjuster 430A to second PLC 420. Second PLC 420 can be mounted to position adjuster 430A but second PLC 420 may be allowed to move along the Y axis so that the connector channels 426 can move relative to stationary connector channels 416. Supports 530 can hold second PLC 420 into contact with base surface 510 but allow connector channels 426 to move along the base surface 510. In one implementation, supports 530 can use a spring to hold second PLC 420 into contact with base surface 510. In one implementation, a sheet in the X-Y plane can be provided between surface 510 and the region in which first PLC 410 and second PLC 420 contact each other. This sheet may improve proper coupling of channels of the first PLC 410 with those of second PLC 420 along the Z-axis by making the coupling to be less sensitive to ridges in the Z-axis on base surface 510.

In another embodiment, position adjuster 430 can be implemented as a micromechanical device to which the second PLC 420 is mounted and that continuously moves the second PLC 420 along the surface 440 of the first PLC 410 and along, for example, the Y axis based on changes in ambient temperature. In another implementation of position adjuster 430 as a micromechanical device, rather than move the second PLC 420 in a continuous manner, position adjuster 430 moves the second PLC 420 according to a step relationship so that second PLC 420 moves incremental distances based on incremental changes in the ambient temperature. For example, this implementation of the position adjuster 430 may move the second PLC 420 along the Y axis a distance of ±X microns each ±Z degrees Celsius change. The micromechanical implementation of the position adjuster 430 can be powered by a battery or photovoltaic device (e.g., solar power). The micromechanical implementation of the position adjuster 430 may use power only when moving the second PLC 420. For example, FIG. 6 depicts an example of beam transfer system 400 that shows second PLC 420 coupled to first PLC 410 using this example implementation of position adjuster 430 (shown as position adjuster 430B).

Figure 6:
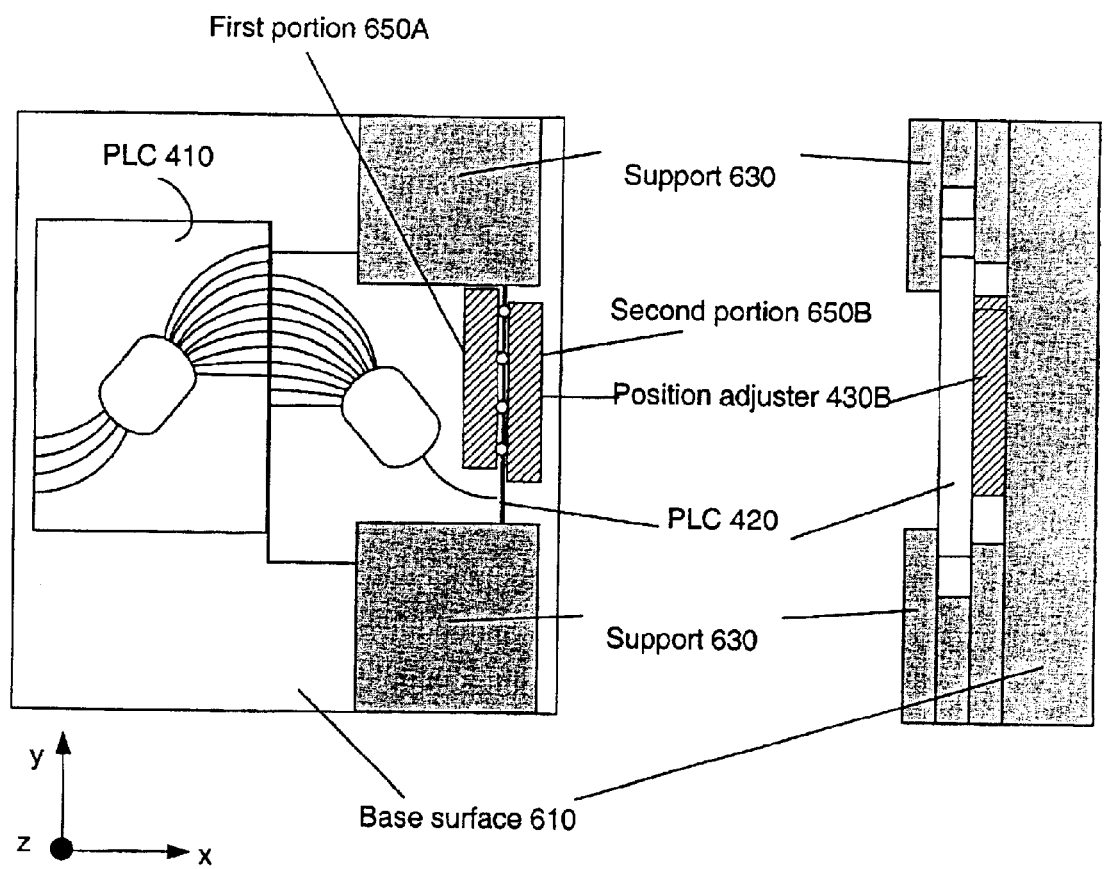

As shown in FIG. 6, first PLC 410 can be mounted to a base surface 610. A glue can be used to mount first PLC 410 to base surface 610. Base surface 610 can have thermal expansion properties similar to those of the layer of first PLC 410 that contacts base surface 610 (e.g., silicon). Supports 630 can hold second PLC 420 into contact with base surface 610 but allow second PLC 420 to move along the Y axis so that the connector channels 426 can move relative to stationary connector channels 416. In one implementation, supports 630 can use a spring to hold second PLC 420 into contact with base surface 610. Position adjuster 430B of this implementation can be positioned between the base surface 610 and the second PLC 420. Position adjuster 430B can include a first portion 650A and second portion 650B. First portion 650A can be affixed to second PLC 420 and second portion 650B can be affixed to base surface 610. Position adjuster 650B may move second PLC 420 by moving first portion 650A relative to second portion 650B in a continuous or step-like manner in response to changes in ambient temperature. In one implementation, a sheet in the X-Y plane can be provided between surface 510 and the region in which first PLC 410 and second PLC 420 contact each other. This sheet may improve proper coupling of channels of the first PLC 410 with those of second PLC 420 along the Z-axis by making the coupling to be less sensitive to ridges in the Z-axis on base surface 510.

One advantage of the position adjuster 430 that moves second PLC 420 in a step motion is less frictional wear of surfaces of materials in contact than that of the system 200. Frictional wear may be less than that of system 200 because position adjuster 430 does not move the second PLC 420 except for incremental changes in ambient temperature. In contrast, system 200 moves the channel 220 for any changes in ambient temperature and so may cause continuous frictional wear.

Figure 7:
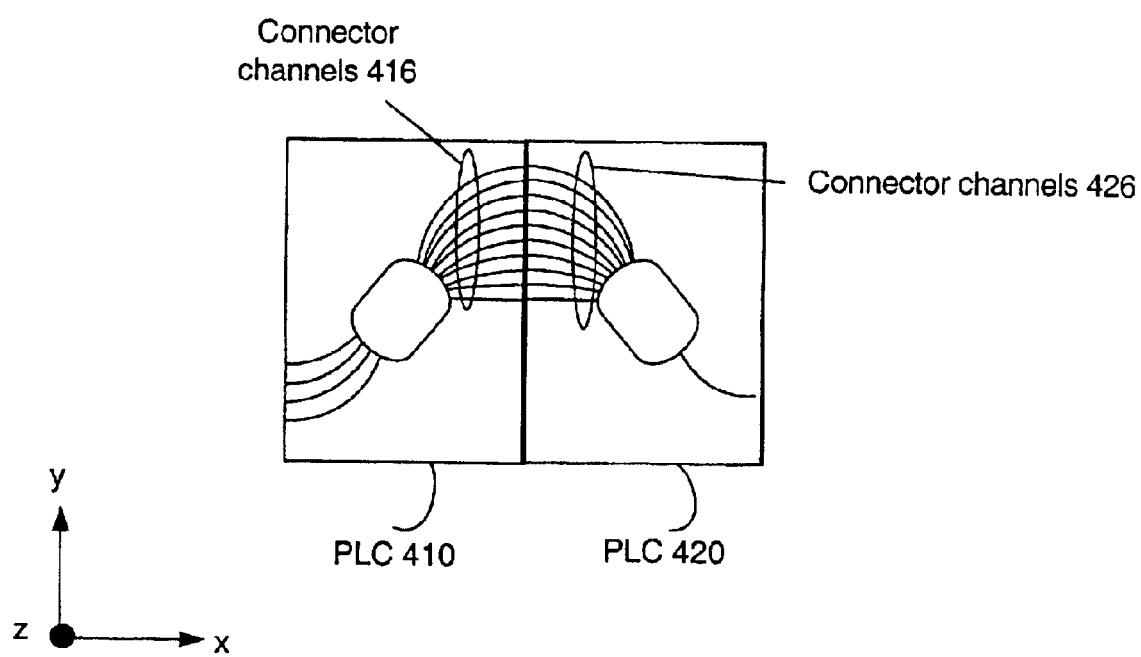
FIG. 7 depicts a manner in which first and second PLCs can be formed in accordance with an embodiment of the present invention.

The first PLC 410 and second PLC 420 of beam transfer system 400 can be fabricated together so that channels of connector channels 416 and connector channels 426 are continuous as shown in FIG. 7. The first PLC 410 can be separated from the second PLC 420 by using a saw or etching technique. The channels may but do not have to be separated approximately half-way along the length of each channel and along the Y axis. The edges of the first PLC 410 and second PLC 420 that are to contact each other or a plate (described in more detail with respect to FIGS. 10–14 below) can be polished.

Figure 1:
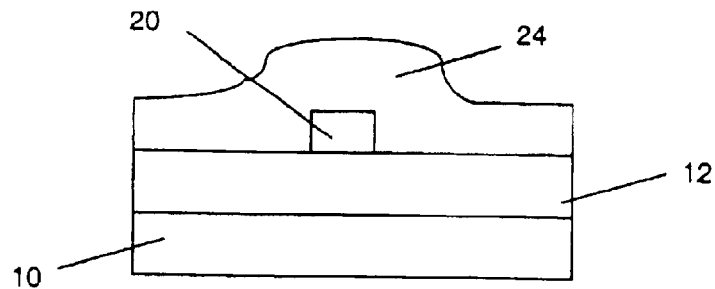
FIG. 1 is a cross sectional schematic diagram that shows a typical SOS architecture.
Figure 2:
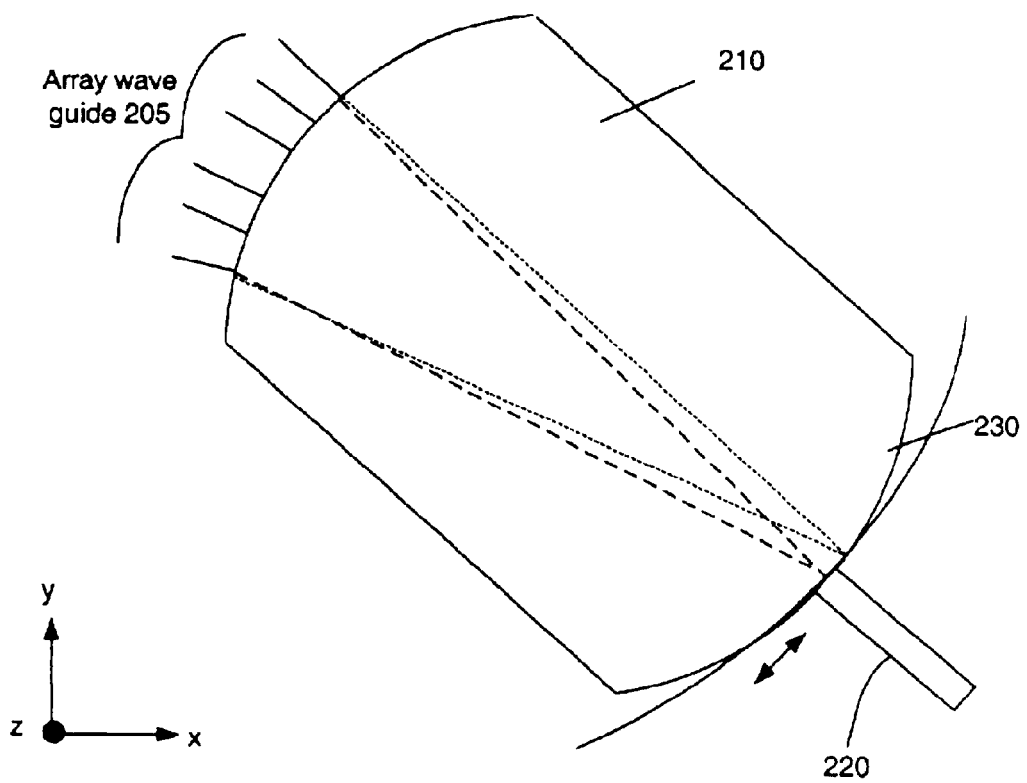
FIG. 2 depicts an example of an arrayed waveguide that transmits signals through a free propagation region to a target channel.

One advantage of embodiments of beam transfer system 400 described herein is they can be easier to fabricate than the system 200 described with respect to FIG. 2. The beam transfer system 400 may be fabricated using high precision straight-line cuts.

The shortest distance between the center axes of adjacent channels can be selected so that the cross talk of signals to be transmitted to adjacent channels of connector channels 426 are nearly in phase (or multiples of approximately 360 degrees out of phase). The shortest distance between the center axes of all adjacent channels along the X-Y plane can be the same but do not have to be the same.

In some implementations of the first PLC 410 and second PLC 420, the grating order (i.e., number of $2\pi$ phase shifts between two neighboring channels) can be an even number and the number of channels can be less than forty (40). In some implementations, first PLC 410 and second PLC 420 can transfer light beams frequency spaced by approximately 100 GHz.

Figure 8A:
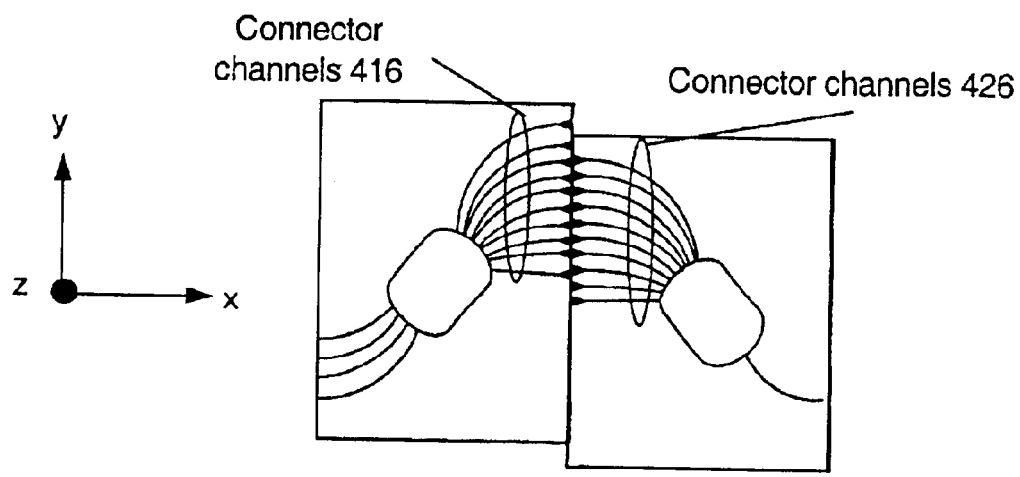
FIGS. 8A, 8B, 9A, and 9B depict examples that show tapered channel openings in accordance with embodiments of the present invention.
Figure 8B:
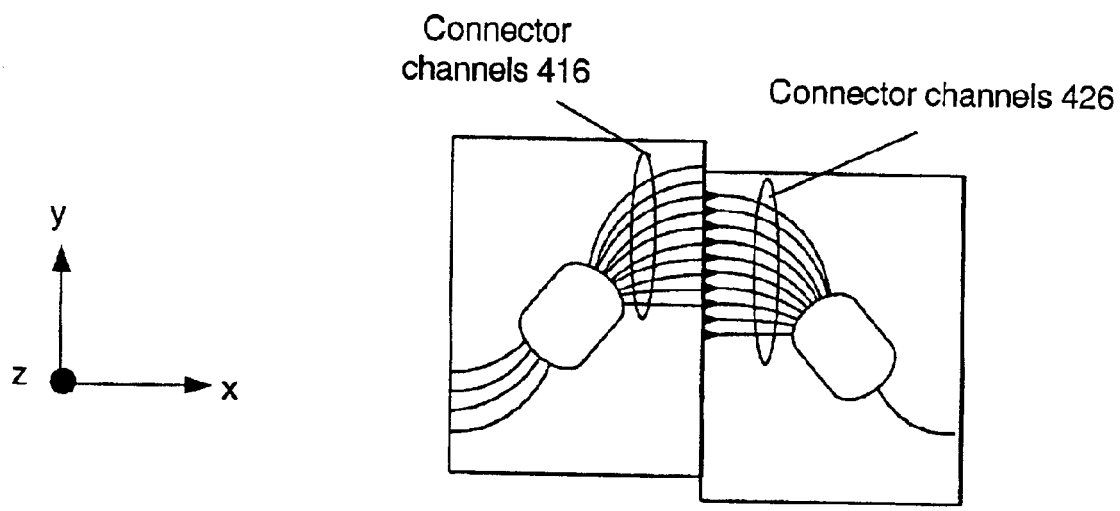

In another embodiment of the present invention, the cross sections (in the Y-Z plane) of connector channels 416 and/or connector channels 426 can widen towards the plane of contact between the connector channels 416 and connector channels 426. For example, FIGS. 8A and 8B depict examples of this embodiment of the present invention that shows tapered channel openings. In three dimensions, the tapers can be cone shaped or parabola shaped. The tapered openings of this embodiment can improve the transfer of optical signals to channels of connector channels 426 from complementary channels of connector channels 416. For example, the widest opening of any channel cross section along the Y-Z plane can be selected so that signal loss caused by receiving an unfocused signal is less than 3 dB. The channel cross section openings among channels of connector channels 416 and/or connector channels 426 can vary.

Figure 9A:
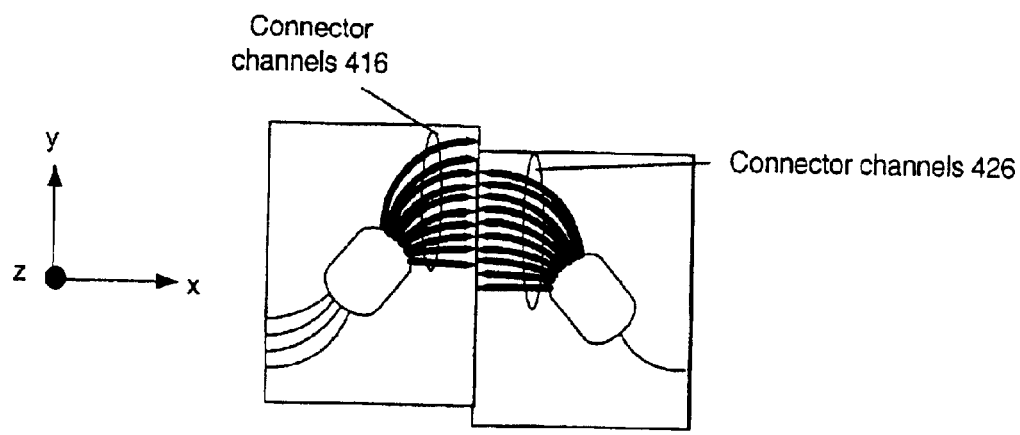
Figure 9B:
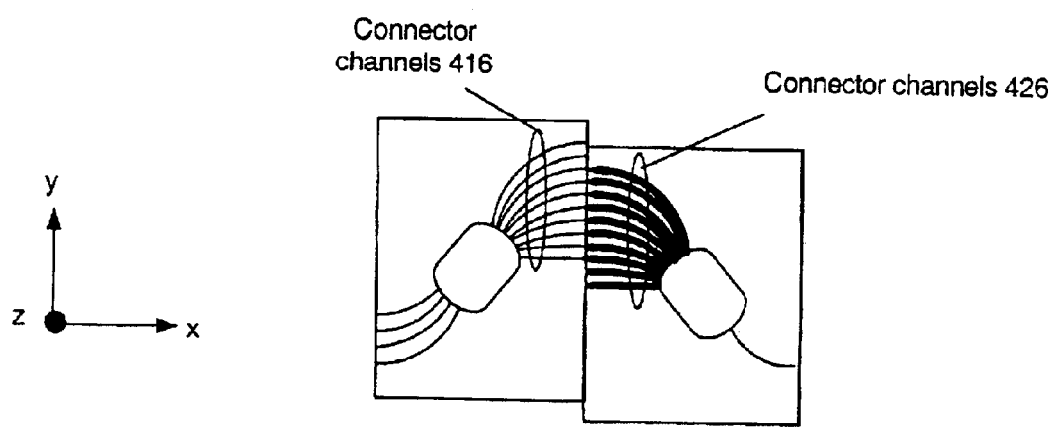
Figure 10:
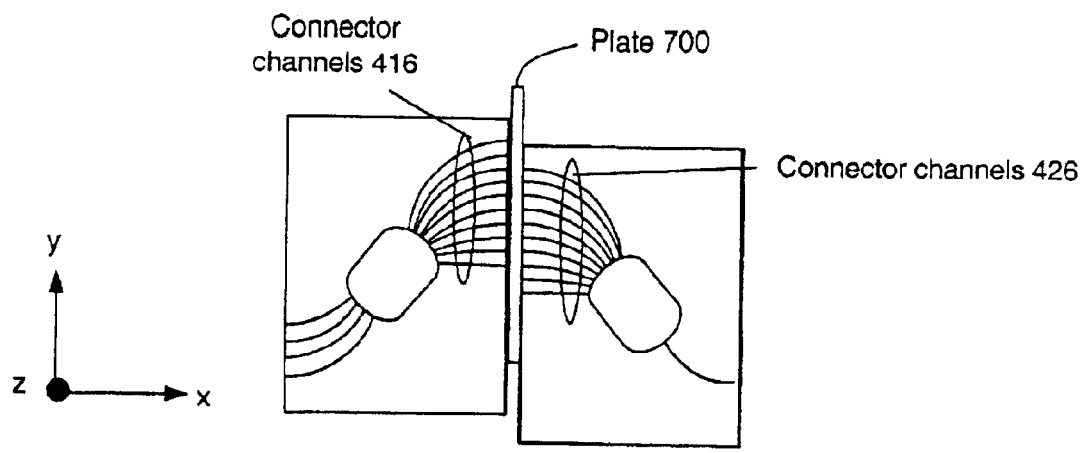
FIGS. 10–14 depict examples of a plate coupling connector channels to complementary connector channels in accordance with embodiments of the present invention.
Figure 11:
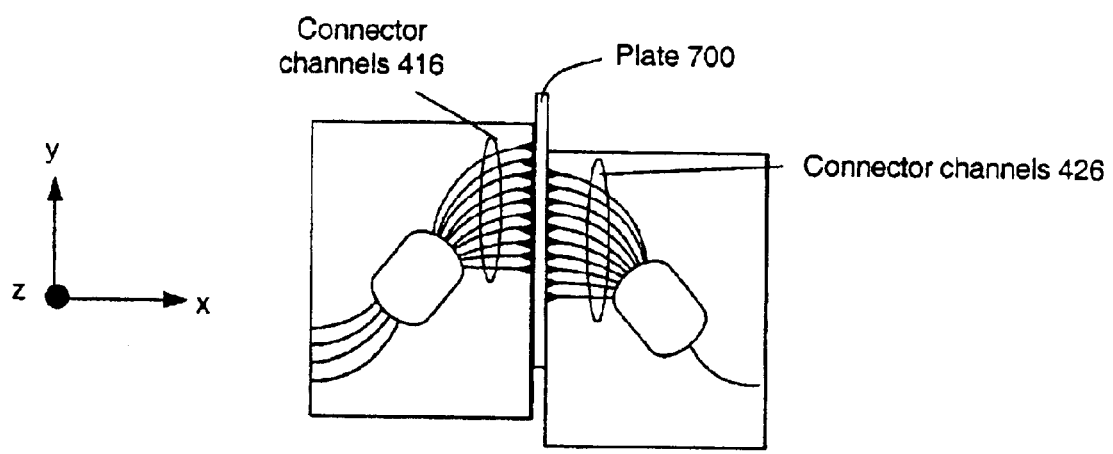
Figure 12:
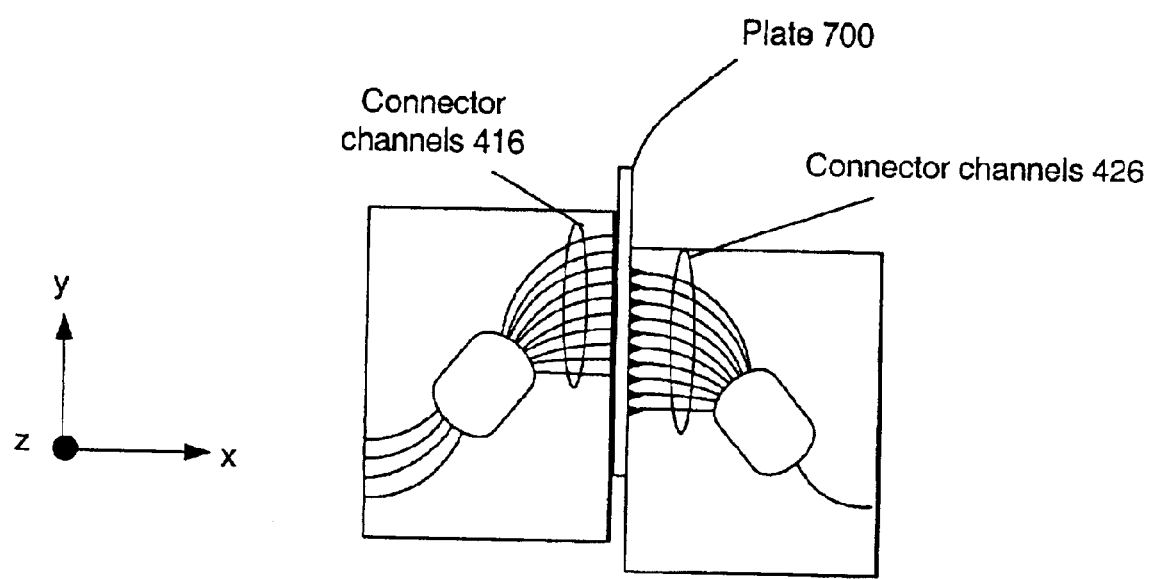
Figure 13:
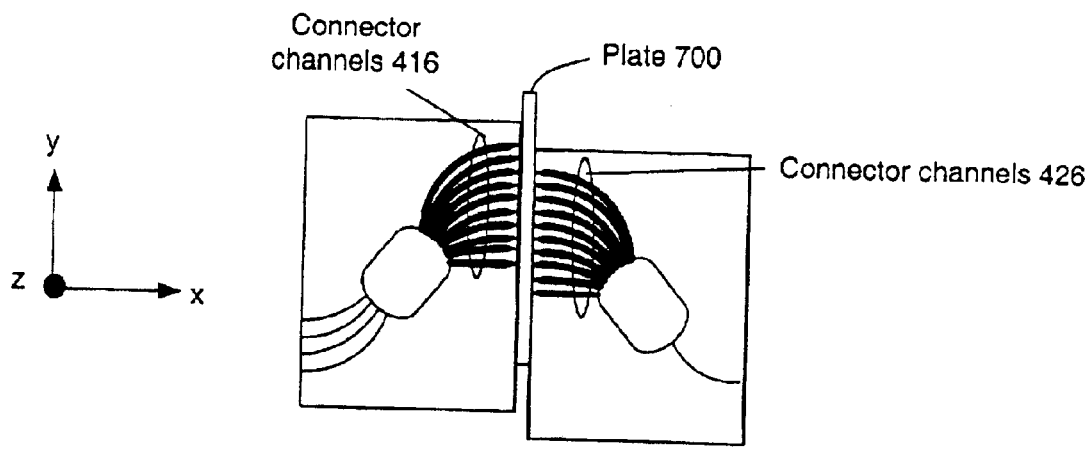
Figure 14:
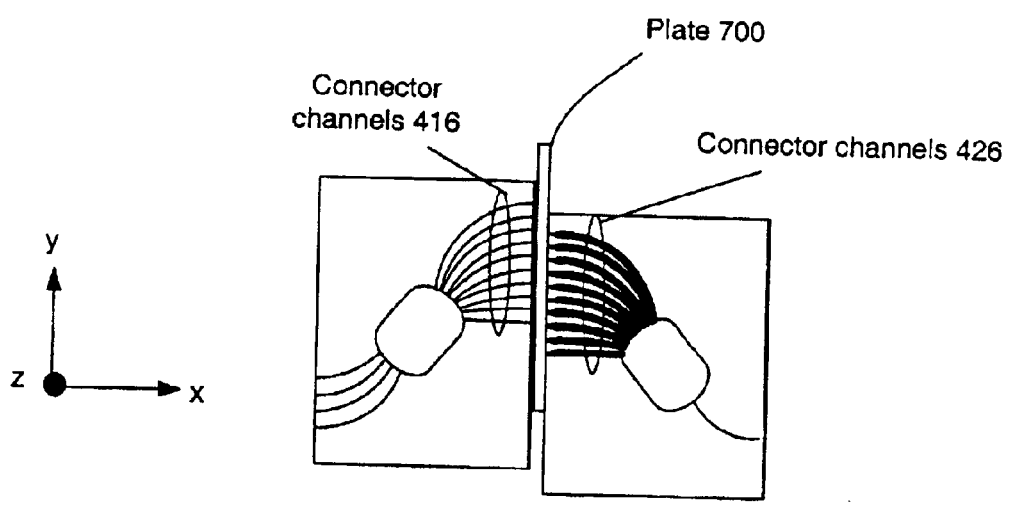

In another embodiment of the present invention, the cross sections (in the Y-Z plane) of connector channels 416 and/or connector channels 426 can decrease towards the plane of contact between the connector channels 416 and connector channels 426. In one implementation, the cross sections can decrease in an exponential manner. For example, FIGS. 9A and 9B depicts examples of this embodiment of the present invention that shows tapered channel openings. In three dimensions, the tapers can be cone shaped.

Similar to focal point drift caused by ambient temperature variations, polarization of signals transferred by connector channels 416 may cause focal point drift that can diminish signal power of signals transferred to connector channels 426. In accordance with an embodiment of the present invention, a plate can be provided along the Y-Z plane to couple signals transmitted by connector channels 416 to complementary channels of connector channels 426. FIGS. 10–14 depict examples of plate 700 coupling connector channels 416 to complementary channels of connector channels 426. Connector channels 416 and connector channels 426 can directly contact the plate 700. The plate 700 can be a birefringence plate that provides, for example, approximately ninety (90) degree rotation of polarization. The plate 700 can be at least as long as necessary to couple all channels of connector channels 416 to complementary channels of connector channels 426. The plate 700 can be affixed to a first PLC 410 using a glue having an index of refraction that matches that of either the channels of connector channels 416 or the plate 700. Connector channels 426 of second PLC 420 can contact the plate 700. In another implementation, the plate 700 can be held stationary using a support structure and the connector channels 416 and connector channels 426 contact the plate 700.

The drawings and the forgoing description gave examples of the present invention. The scope of the present invention, however, is by no means limited by these specific examples. Numerous variations, whether explicitly given in the specification or not, such as differences in structure, dimension, and use of material, are possible. For example, the techniques described herein can be applied in any scenario, and not just arrayed waveguides, to compensate for focal drift where signals are to be transmitted from one optical channel to another optical channel. The scope of the invention is given by the following claims.

What is claimed is:

1. An apparatus comprising:
 a first planar lightwave circuit ("PLC") having at least two channels to guide signals;
 a second PLC having at least two channels, wherein at least one of the channels of the second PLC is to receive the signals from at least one of the channels of the first PLC and wherein at least one channel of the second PLC does not have a complementary signal providing channel in the first PLC; and
 a position adjuster to adjust the location of the channels of the second PLC relative to the channels of the first PLC in response to changes in ambient temperature.

2. The apparatus of claim 1, wherein the position adjuster is mounted to the second PLC and mounted to a stationary surface and wherein the position adjuster is to adjust the location of the second PLC by a change in the length of the position adjuster.

3. The apparatus of claim 1, wherein the position adjuster is to adjust the location of the second PLC according to a step function relationship between temperature change and distance.

4. The apparatus of claim 3, wherein the position adjuster comprises a micro mechanical device.

5. The apparatus of claim 4, further comprising a power source to power the micro mechanical device and wherein the power source provides power to the micro mechanical device only when the micro mechanical device adjusts the location.

6. The apparatus of claim 1, wherein the position adjuster comprises a micro mechanical device.

7. The apparatus of claim 1, further comprising a plate to filter signals from the first PLC and to transfer the filtered signals to at least one of the channels of the second PLC.

8. The apparatus of claim 7, wherein the plate comprises a birefringence plate.

9. The apparatus of claim 7, wherein the plate rotates polarization of signals from the first PLC by approximately ninety degrees.

10. The apparatus of claim 7, wherein the plate is affixed to the first PLC.

11. The apparatus of claim 10, wherein the plate is affixed to the first PLC using a gel index matched to the at least two channels of the first PLC.

12. The apparatus of claim 1, wherein the cross sectional area of at least one of the channels of the second PLC increases towards signal coupling with at least one of the channels of the first PLC.

13. The apparatus of claim 12, further comprising a plate to filter signals from the first PLC and to transfer the filtered signals to at least one of the channels of the second PLC.

14. The apparatus of claim 12, wherein at least one of the channels of the first PLC increases in cross sectional area towards signal coupling with at least one of the channels of the second PLC.

15. The apparatus of claim 14, further comprising a plate to filter signals from the first PLC and to transfer the filtered signals to at least one of the channels of the second PLC.

16. The apparatus of claim 1, wherein the cross sectional area of at least one of the channels of the second PLC decreases towards signal coupling with at least one of the channels of the first PLC.

17. The apparatus of claim 16, further comprising a plate to filter signals from the first PLC and to transfer the filtered signals to at least one of the channels of the second PLC.

18. The apparatus of claim 16, wherein the cross sectional area of at least one of the channels of the first PLC decreases towards signal coupling with at least one of the channels of the second PLC.

19. The apparatus of claim 18, further comprising a plate to filter signals from the first PLC and to transfer the filtered signals to at least one of the channels of the second PLC.

20. The apparatus of claim 1, wherein spacing between adjacent channels in the second PLC is substantially similar.

21. The apparatus of claim 1, wherein spacing between channels in the second PLC is set so that crosstalk of received signals is a multiple of approximately 360 degrees out of phase.

22. A method comprising:
 forming a planar lightwave circuit having at least two channels;
 separating the planar lightwave circuit into at least two portions, including first and second portions, wherein at least one channel of the second portion is capable of receiving signals from at least one channel of the first portion and wherein at least one channel of the second portion does not have a complementary signal providing channel in the first portion; and
 providing adjusting capability, wherein the adjusting capability comprises capability to change alignment of the at least one channel of the second portion relative to the at least one channel of the first portion in response to changes in ambient temperature.

23. The method of claim 22, wherein the adjusting capability comprises capability to change the physical alignment of the at least one channel of the second portion relative to the at least one channel of the first portion in a step-like relationship between distance and temperature change.

24. The method of claim 22 further comprising:
providing polarization adjusting capability, wherein the polarization adjusting capability includes capability to adjust the polarization of signals transmitted from the at least one channel of the first portion by approximately 90 degrees and transfer polarization adjusted signals to the at least one channel of the second portion.

25. The method of claim 22, wherein the forming includes forming the at least two channels to each have a cross section that increases towards a plane of separation between the first and second portions.

26. The method of claim 25, wherein the separating further comprises separating along a plane at which channel cross section is a maximum.

27. The method of claim 22, wherein the forming includes forming the at least two channels to each have a cross section that tapers down towards a plane of separation between the first and second portions.

28. The method of claim 27, wherein the separating further comprises separating the at least two channels in a region where the cross sectional area is approximately a minimum.

29. A system comprising:
an optical beam source that selectively transfers optical beams;
a channel alignment system, wherein the channel alignment system includes:
a first planar lightwave circuit ("PLC") having at least two channels to guide the optical beams;
a second PLC having at least two channels, wherein at least one of the channels of the second PLC is to receive the optical beams from at least one of the one channels of the first PLC and wherein at least one channel of the second PLC does not have a complementary signal providing channel in the first PLC; and
a position adjuster to adjust the location of multiple channels of the second PLC relative to multiple channels of the first PLC in response to changes in ambient temperature.

30. The system of claim 29, wherein the position adjuster is mounted to the second PLC and mounted to a stationary surface and wherein the position adjuster is to adjust the location of the second PLC by a change in the length of the position adjuster.

31. The system of claim 29, wherein the position adjuster is to adjust the location of the second PLC according to a step function relationship between temperature change and distance.

* * * * *